United States Patent
Roesel, Jr. et al.

(10) Patent No.: US 6,751,842 B2
(45) Date of Patent: Jun. 22, 2004

(54) METHOD OF CONSTRUCTING A ROTOR FOR USE IN A HIGH SPEED CONTROLLED-POLE ELECTRIC MACHINE

(75) Inventors: John F. Roesel, Jr., Bradenton, FL (US); Ronnie J. Barber, Bradenton, FL (US)

(73) Assignee: Precise Power Corporation, Bradenton, FL (US)

( * ) Notice: Subject to any disclaimer, the term of this patent is extended or adjusted under 35 U.S.C. 154(b) by 334 days.

(21) Appl. No.: 09/839,470

(22) Filed: Apr. 19, 2001

(65) Prior Publication Data

US 2003/0204947 A1 Nov. 6, 2003

Related U.S. Application Data

(62) Division of application No. 09/303,070, filed on Apr. 30, 1999, now Pat. No. 6,229,243.

(51) Int. Cl.$^7$ .......................... H02K 15/02; H02K 15/10
(52) U.S. Cl. .......................... 29/598; 29/596; 29/592.1; 310/42; 310/45; 310/217; 310/261; 310/262
(58) Field of Search .......................... 29/592.1, 596, 29/598; 310/42, 45, 217, 261, 262

(56) References Cited

U.S. PATENT DOCUMENTS

| | | | |
|---|---|---|---|
| 4,117,360 A | 9/1978 | Richter | 310/183 |
| 4,227,136 A | * 10/1980 | Roesel, Jr. | 318/701 |
| 4,433,261 A | 2/1984 | Nashiki et al. | 310/156 |
| 4,600,873 A | 7/1986 | Roesel, Jr. et al. | 318/701 |
| 4,638,200 A | 1/1987 | Corre et al. | 310/156 |
| 4,661,183 A | 4/1987 | Beard | 156/172 |
| 4,663,536 A | * 5/1987 | Roesel et al. | 290/7 |
| 4,678,954 A | 7/1987 | Takeda et al. | 310/156 |
| 4,893,040 A | 1/1990 | Turner et al. | 310/156 |
| 5,485,045 A | 1/1996 | Canders et al. | 310/156 |
| 5,721,459 A | 2/1998 | Rao et al. | 310/74 |
| 6,236,134 B1 | * 5/2001 | Syverson | 310/181 |

FOREIGN PATENT DOCUMENTS

JP          10032968 A   *  2/1998  .......... H02K/23/04

OTHER PUBLICATIONS

"Electromechanical forces and torque in brushless permanent magnetic machines", Gangla, V.; de la Ree, J.; Energy Conversion, IEEE Transactions on, vol.: 6 Issue: 3, Sep. 1991, Page(s): 546–552.*

* cited by examiner

Primary Examiner—A. Dexter Tugbang
Assistant Examiner—Paul D Kim
(74) Attorney, Agent, or Firm—Sacco & Associates, PA

(57) ABSTRACT

A method of constructing a rotor for use in a high speed controlled-pole electric machine includes the steps of positioning an inner layer of remagnetizable permanent magnetic material over substantially an entire circumference of a rotor core exterior surface, and positioning a outer layer of remagnetizable permanent magnetic material positioned over substantially an entire circumference defined by said inner layer of remagnetizable permanent magnetic material. The inner layer of permanent magnetic material can have a first set of magnetic properties and the outer layer of permanent magnetic material can have a distinct second set of magnetic properties. The layers of remagnetizable permanent magnetic material can be formed from a plurality of magnetic blocks. The method can include the step of binding the layers of remagnetizable permanent magnetic material to the rotor using high strength wire.

15 Claims, 8 Drawing Sheets

METHOD OF CONSTRUCTING A ROTOR FOR USE IN A HIGH SPEED CONTROLLED-POLE ELECTRIC MACHINE

This application is a division of application Ser. No. 09/303,070, filed Apr. 30, 1999, now U.S. Pat. No. 6,229,243.

BACKGROUND OF THE INVENTION

1. Field of the Invention

This invention relates to the construction of a machine rotor, in particular, it relates to the construction of rotors for high-speed, controlled-pole electric machines. For purposes of this application, the term high-speed machine shall mean a rotating machine wherein the rotational speed and the diameter of the rotating portion of the machine are such as, in their combination, to give rise to centrifugal forces of such magnitude acting upon the rotating portion of the machine as to require explicit consideration in the design and construction of the machine.

2. Description of Related Art

A controlled-pole electric machine includes a rotor and a stator, each held in position by a frame in such a fashion as to permit continuous mechanical rotation of the rotor relative to the stator.

Typically in controlled-pole machines, the adjacent surfaces of the rotor and the stator are of nominally cylindrical form, each of diameter similar to but not identical to the diameter of the other, the axes of these cylindrical surfaces being coaxial with each other such that the surface of the rotor passes in close fixed proximity to the surface of the stator during rotation of the rotor about this axis; the clearance region between said surfaces being otherwise known as the airgap. Controlled-pole machines may be of external rotor construction having the rotor outside the airgap such that the rotor surrounds the stator, or they may be of internal rotor construction having the rotor inside the airgap such that the stator surrounds the rotor.

A controlled-pole rotor includes an annular layer of permanent magnetic material, one surface of which, absent certain restraining materials which are a part of the invention described herein, is adjacent to and defines one boundary of the airgap; the magnetic material is usually mounted upon a core of high magnetic permeability, low eddy current and magnetic hysteresis loss material and attached to a rotating mechanical shaft. The permanent magnetic material in controlled-pole machines typically comprises a ferrite based, fired ceramic material having very low electrical conductance, high remanent magnetization, and a coercive force tailored to its controlled-pole usage.

A controlled-pole stator usually includes a structure of high magnetic permeability, low eddy current and magnetic hysteresis loss material having a number of slots running nominally axially along its airgap surface in which are inserted windings consisting of a number of electrical conductors; said electrical conductors often comprising, in part, several multi-turn coils, and being rotationally positioned and electrically interconnected so as to achieve the desired electrical, magnetic and mechanical characteristics. Certain of these windings, otherwise known as the main windings, are of such a number, positioning, and electrical connection as to be comparable in their function to the windings of a conventional fixed-pole electric machine. Certain other of these windings, otherwise known as the exciter windings and which are unique and essential to the controlled-pole machine, are of such a number, positioning, and electrical connection as to permit controlling the direction and magnitude of the magnetization of the rotor's permanent magnetic material during operation of the machine.

During the rotor's rotation, the permanent magnetic material of the rotor passes in close proximity to the stator, and in consequence of this motion and of the passage of an alternating current of appropriate magnitude through the exciter winding, the rotor's permanent magnet layer is magnetized into a pattern of radially directed, alternating north and south magnetic poles, the effective rotational speed of said magnetic poles thereby being in synchronization with the alternating currents in the exciter winding irrespective of the rotational mechanical speed of the rotor. Subsequently, in the case of the machine's functioning as a motor; these north and south magnetic poles in passing in close proximity to the main windings interact with the magnetic field produced by alternating currents in the main windings supplied from an external source thereby producing a rotor torque; or, in the case of the machine's functioning as a generator, an alternating pattern of north and south magnetic poles is produced in the rotor's magnetic layer in a manner similar to that described for the case of the motor, and an externally supplied torque causes the rotor's north and south magnetic poles to pass in close proximity to the main windings thereby inducing an alternating current in the main windings and thence to any externally connected electrical load, said main winding currents being synchronous with the currents in the exciter windings irrespective of the rotational mechanical speed of the rotor. In both cases, the alternating current in the exciter windings and the alternating currents in the main windings are caused to be synchronized with each other through the controlling of the rotor's magnetic poles and are independent of the speed of mechanical rotation of the rotor, thus permitting the delivery of continuous, smooth torque independent of speed in the case of the machine's functioning as a synchronous motor, or the continuous delivery of a constant frequency alternating electrical current independent of speed in the case of the machine's functioning as a synchronous alternator.

It is common to construct the rotor's permanent magnet layer from a number of individual pieces of magnetic material assembled in mosaic-like fashion in one or more annular layers to form the desired composite magnetic cylinder, the individual pieces typically being bonded to each other and to the underlying high permeability core by means of a bonding agent such as a high strength epoxy.

The operation of a rotor of this form of construction as a controlled-pole rotor creates several conditions which, in a manner or degree not material to operation of a fixed-pole machine and not obvious to those skilled in the art of fixed-pole or controlled-pole machines, present opportunity for inventive enhancement or which rise to the level of becoming problematic and compelling of inventive solution. This is particularly true in a machine of internal rotor construction having the rotor inside the airgap such that the stator surrounds the rotor, One such instance arises from the substantial thickness of the annular magnetic material layer of the internal rotor which results when two adjacent cylindrical surface layers of the magnetic material of the rotor have significantly different diameters and, as a consequence, significantly different surface areas. In the controlled-pole machine, it is common for these respective cylindrical surface areas to differ by twenty percent or more. This condition also obtains for the cylindrical surface of the high permeability core of the stator adjacent to the airgap and for the cylindrical surface of the high permeability core of the rotor underlying the magnetic material layer. During operation of the controlled-pole machine, substantially all the magnetic flux produced within the stator core by the currents in the various stator windings and the magnetic flux produced by the rotor's layer of magnetic material traverses and is contained within the high permeability core of the stator, the airgap, the rotor's magnetic material layer, and the high permeability core of the rotor. The combination of all these circumstances, that is substantially constant total quantity of magnetic flux traversing said regions, and said surfaces varying in area according to their distance from the axis of rotation, results in a condition wherein the magnetic flux density varies throughout the volume of the magnetic material layer of the rotor according to the distance from the axis of rotation.

Additionally, while the magnetic flux produced by currents in the main winding typically traverses the magnetic layer in a radial or substantially radial direction, in some embodiments, the magnetic flux produced by currents in the exciter winding can depart significantly from a radial direction in its traversal of the interior regions of the rotor's layer of magnetic material. This can cause additional variations in flux density vs. depth into the magnetic layer over those described above for the magnetic fields produced by the currents in the exciter windings, thereby causing variation in the remagnetization effectiveness of the exciter winding currents with depth in the magnet layer.

Also, the performance objectives of a controlled-pole rotor can require an annular magnet layer that is thicker in the direction of the magnetization axis of the ferrite than current manufacturing techniques are able to achieve, thereby requiring the magnet layer be constructed as a composite layer of magnet material comprising two or more individual annular magnet layers. This combination of radially varying magnetic field densities and multiple layers of magnet material presents an inventive opportunity to enhance operation of the controlled-pole machine by employing magnets having magnetic properties tailored to each of the different layers.

Another area permitting of inventive attention in the construction of the controlled-pole internal rotor arises from the circumstance that during operation, a machine rotor experiences centrifugal forces which act on the components of the rotor in a manner which will cause them to depart from the rotor and their circular path of motion if there are not sufficient restraining centripetal forces present arising out of the properties of the materials and construction of the rotor so as to completely counter said centrifugal forces and hold the components in place. Additional structural devices and/or alternative materials and construction methods can be required to assure safe and reliable high-speed operation of a rotating machine. Several operating phenomena and functional requirements unique to controlled-pole machines have important significance to the design of the high-speed, controlled-pole rotor, and in particular, to the internal rotor controlled-pole machine.

In a controlled-pole rotor of internal rotor construction, the permanent magnet layer lies at the outer periphery of the rotor where centrifugal forces are greatest and where, in the absence of any specially added separate restraining mechanism(s), the only intrinsic mechanisms providing the centripetal forces necessary to counter said centrifugal forces and prevent separation of the rotor components are those provided by the bonding agents, by friction, and by such magnetic forces as may from time to time be present. Several phenomena can occur during operation of the controlled-pole rotor which can further limit the effectiveness of these intrinsic restraining mechanisms.

First, the ferrite ceramics typically used in the controlled-pole machine commonly have fissile properties arising from the process used in their manufacture and which can result in the magnets fracturing or delaminating along planes that are nominally parallel to the air gap. Also, this potential for delamination can be aggravated by certain aspects of the thermal stresses discussed further below. In the internal rotor machine in particular, if delamination should occur, the vulnerability of the magnets to the previously discussed centrifugal forces is increased. Consequently, construction of the controlled-pole motor must accommodate the potential fissile property of its magnets by means of identifying and eliminating potentially problematic magnets from its construction, and/or by incorporation of a restraining mechanism that will operate effectively on delaminated fragments.

Second, in a controlled-pole machine, the rotor's magnetic layer can experience a greater and significantly more rapid increase in temperature than is experienced by conventional fixed-pole permanent magnet machines of otherwise equivalent design. This is a consequence of hysteresis loss occurring in the magnetic layer of the controlled-pole rotor whenever it is being remagnetized under controlled-pole or start-up operation and which manifests itself as heat being produced within the body of the magnetic material. The magnetic material employed in controlled-pole machines is typically a ferrite based ceramic having a coefficient of thermal expansion markedly different from that of the underlying metal core; such ceramics also typically have significantly lower coefficients of thermal conductivity than the core. All these conditions combine uniquely in the controlled-pole machine to produce the potential for there being substantial shear forces between the magnetic material and the core, thereby increasing internal bond stresses and reducing the bonds' operating limits. Consequently, construction of the controlled-pole motor must accommodate this differential thermal expansion to avert the large shear forces which otherwise can result between the magnetic layer and the core, and/or incorporate additional mechanical devices to augment the centripetal restraining forces provided by the epoxy bonds.

These phenomena suggest the incorporation of additional mechanical device(s) around the outer surface of the magnet layer to augment the centripetal restraining forces already present, similar devices having been incorporated in fixed-pole machines. However, in a controlled-pole machine, such a device must not only take into account the thermo-mechanical issues peculiar to controlled-pole operation as discussed above, but any object placed around or otherwise in close proximity to the magnetic material for structural purposes must also take into account certain electromagnetic issues peculiar to electric machine operation in general or controlled-pole machine operation in particular.

First, the combination of the thickness and the magnetic properties of any layer interposed between the magnetic layer and the airgap for structural purposes must be such as to not materially reduce the radially directed magnetic flux emanating from the permanent magnet layer and linking with the main stator windings across the airgap.

Second, the magnetic fields produced by the controlling alternating currents in the stator exciter winding can induce eddy currents in any component which might be added to the controlled-pole rotor to provide mechanical constraint to the magnets and which is also electrically conductive thereby resulting in resistive heating losses therein, such eddy current losses being the reason machine cores are typically made of laminated steel or non-conductive, magnetically soft ferrite materials, high magnetic permeability also being a desirable property of these cores.

Third, eddy currents also produce magnetic fields which are in opposition to the magnetic field inducing the eddy current. It being the purpose of the magnetic field produced by the exciter winding currents to remagnetize the rotor's permanent magnetic layer, any such opposing eddy current field which might occur in any material interposed between the magnetic layer and the airgap for structural purposes can reduce the strength of the remagnetizing field within the magnetic material thereby impeding controlled-pole operation.

Fourth, the presence of winding slots in the cylindrical surface of the stator results in a condition where rotation of the rotor causes any given spot on the rotor's cylindrical surface to pass a substantial number of slot edges during each rotation of the rotor. During operation of the controlled-pole machine, the magnetic fields produced in the stator by currents in the main windings as well as those produced in the stator by the rotor's permanent magnetic material are, when traversing the slot region of the stator core, primarily concentrated in the inter-slot, high permeability portion of the stator core. This results in there being, at any given spot on the rotor's airgap surface, an abrupt and substantial change in the magnitude of the magnetic field as that spot passes each slot edge. Some embodiments of the controlled-pole internal rotor machine may include as manifestations of the inventions described herein, a thin layer of material adjacent to the airgap and overlying the remagnetizable permanent magnet material layer to provide restraint for the magnetic material against centrifugal forces. If said restraining material layer is magnetically permeable, as would be the case for a material such as high tensile strength steel piano wire, there can result, due to said differences in field strengths between the inter-slot, high permeability core region and the slot opening, significant magnetic field components tangential to the rotor's cylindrical surface, further, said tangential components can experience a reversal in direction at each passage across a slot edge. If said restraining material layer further has properties of remanence and coercive force, as would again be typical of a material such as high tensile strength steel piano wire, there can result magnetic hysteresis loss within said restraining material layer at each crossing of a slot edge and corresponding reversal of magnetic field, there being two such edge crossings for every slot for every rotation of the rotor. In an otherwise typical controlled-pole machine where consideration is not given to this effect, the cumulative hysteresis loss occurring within the restraining wire layer of a rotor of such construction can be more than one percent of the total power of the machine. As a consequence, the design and construction of any restraining mechanism interposed between the magnetic layer and the airgap must be limited in thickness, electrical conductivity, and in magnetic permeability or remanence while offering high tensile strength and compatibility in thermal expansion with the other components of the rotor.

Due to the relative geometric proportions of the slots, the airgap diameter, and the thickness of the remagnetizable permanent magnet layer in typical controlled-pole machines, and specifically in controlled-pole machines having two or more layers of magnetic material, the abrupt changes in magnetic field due to the inter-slot high permeability stator core and the open slots diminish as the fields penetrates deeper into the permanent magnetic material layer, becoming negligible at the interface between layers of permanent magnetic material. In this region, however, there can be localized abrupt changes in the magnetic field arising from gaps between individual blocks of magnetic material and the mosaic tile type construction of the layer, and it can then, by contrast with the case at the surface of the rotor, be beneficial to employ a magnetically permeable material for the restraining material overlying any inner layers of magnetic material in order to smooth the overall distribution of the magnetic field.

SUMMARY OF THE INVENTION

The present invention is an apparatus which overcomes the deficiencies in the prior art. The present invention is a rotor for use in a high speed controlled-pole electric machine. A rotor for use in a high speed controlled-pole electric machine in accordance with the inventive arrangements provides advantages over all current rotors now used and provides a novel and nonobvious construction of a rotor for use in a high speed controlled-pole electric machine. A rotor for use in a high speed controlled-pole electric machine can include a rotor core having an exterior surface; a first layer of remagnetizable permanent magnet material positioned about the rotor core exterior surface; and a first layer of high strength material binding the first layer of remagnetizable magnetic material to the rotor core exterior surface. Notably, the rotor core can be a laminated steel rotor core.

Where used in a smaller controlled-pole electric machine, only a single layer of remagnetizable magnetic material may be necessary. However, where used in a larger controlled-pole electric machine, including several layers of remagnetizable permanent magnet material may be advantageous. In particular, the present invention can include one or more layers of remagnetizable permanent magnet material disposed about the first layer of remagnetizable magnetic material and the rotor core exterior surface. Moreover, the present invention can include an additional layer of high strength material binding each successive layer of remagnetizable magnetic material to the layer of remagnetizable magnetic material beneath it. A general embodiment of this concept would cause successive composite layers comprising a layer of remagnetizable magnetic material followed by a layer of high strength material to be placed over underlying similar composite layers until the desired overall thickness of magnetic material is obtained.

The individual layers of remagnetizable permanent magnetic material in a multi-layer structure can each comprise a remagnetizable permanent magnet material differing somewhat in its magnetic properties from layer to layer in order to compensate for the variations which can occur radially throughout the volume of the magnetic material in the flux densities of the magnetic fields.

Further, each layer of remagnetizable material can comprise a plurality of magnetic blocks positioned adjacent to one another. Each magnetic block can have a separation gap between each adjacent magnetic block. The separation gap can be calculated to allow for a thermal expansion of each magnetic block relative to the adjacent magnetic blocks.

The rotor can also include in each layer of remagnetizable magnetic material an adhesive layer disposed on each magnetic block surface facing the rotor core surface or the surface of a magnetic block beside it. The use of a thermally conductive, pliant adhesive in the construction of the present invention can improve the thermal conductivity between the layer(s) of remagnetizable magnetic material and the rotor core. In addition, because the high strength layer provides the necessary binding force, the adhesive layer need not be chosen only for its bonding strength characteristics. Rather, the adhesive can be chosen for its low viscosity and wetting ability during application and for its thermal conductivity, pliability and resistance to thermal aging once set.

The high strength material used to bind each of the layers of remagnetizable magnetic material preferably should exhibit strength properties similar to common music wire. Music wire typically has a tensile strength ranging from 225,000 PSI to over 400,000 PSI. Moreover, the high strength material used to bind the inner layers of remagnetizable magnetic material preferably should exhibit the magnetic properties of common music wire. Specifically, common music wire has the magnetic properties of a low coercive permanent magnet. The magnetic properties of each of the inner layers of high strength material can serve to improve the magnetic path of the rotor flux by bridging gaps between separate magnetic blocks in each layer of remagnetizable magnetic material. In the preferred embodiment, the coercivity of the first layer of high strength wire typically can be in the order of 50 oersteds. In addition, the residual induction can be approximately one tesla, or 10,000 gauss.

Reduction of slot edge magnetic field change induced hysteresis losses in and due to the outermost high strength material binding layer adjacent to the stator is of importance. This can be accomplished by employing a non-conductive non-magnetic high strength fiber of a material such as carbon, for instance, for the outer layer of high strength material. Alternatively, the outer layer can be made effectively non-electrically conductive by employing a suitably high electrical resistance, non-magnetic, high strength metallic wire consisting of, for instance, a material such as certain stainless steel alloys, each strand of said metallic wire being placed circumferentially on the rotor and in such a fashion as to leave a space between each adjacent strand of wire such that there is no axially directed electrical path between the adjacent strands. Thus, it is an advantage of the present invention that the use of a high resistance or a non-conductive non-magnetic layer of high strength material can reduce losses in the outermost binding material layer caused by eddy currents and by flux reversals caused by slot-edge induced rapid flux changes in the air gap.

A method of constructing a rotor for use in an internal rotor, high speed, controlled-pole electric machine can comprise the steps of: positioning a plurality of magnetic blocks about a rotor core exterior surface, the magnetic blocks forming a first layer of remagnetizable magnetic material; and, binding the first layer of remagnetizable magnetic material to the rotor core exterior surface using a first layer of high strength wire or fiber. The method can further comprise the steps of: positioning a plurality of magnetic blocks about the first layer of remagnetizable material, the magnetic blocks forming a second layer of remagnetizable magnetic material; and, binding the second layer of remagnetizable magnetic material to the first layer of remagnetizable magnetic material and the rotor core exterior surface using a second layer of non-conductive non-magnetic high strength fiber or wire. One skilled in the art, however, will appreciate that, while only a single layer of remagnetizable magnetic material may be necessary in smaller controlled-pole machines, and that larger machines may require two or more layers may be required, the binding for the outermost layer should consist of non-conductive, non-magnetic wire or fiber, and that the binding of any intermediate layers should consist of magnetic high strength wire.

The positioning step can further include: calculating a separation gap between each adjacent magnetic block to allow for a thermal expansion of each magnetic block; and, separating each magnetic block by the calculated distance. In one embodiment, the separation can be in the order of 0.002 inches for each inch of magnetic block length. The method can further include the step of applying a thermally-conductive pliant adhesive layer on each magnetic block surface facing the rotor core exterior surface or facing the surface of an adjacent magnetic block, the adhesive layer holding each magnetic block in place prior to the binding step.

Finally, the binding step can further include: pretensioning one or more parallel strand(s) of high strength fiber or wire filaments to a tenseness substantially greater than that required to counter the maximum centripetal force anticipated to be experienced by the layer of remagnetizable magnetic material being bound when rotating the rotor in a high-speed controlled-pole electric machine; securing one end of the high strength fiber or wire(s) to one end of the rotor; and, wrapping the filament(s) about the layer of remagnetizable magnetic material, securing a second end of the filament(s) to a second end of the rotor, thereby forming a plurality of parallel strands. In the case where high strength metal wire is used for the binding layer, having a small but distinct space between each parallel strand of the high strength wire greatly increases the electrical resistance of the layer in the axial direction thereby reducing eddy current losses to an acceptable level. Further, winding multiple filaments side by side in an in-hand fashion constituting a single lay, preserving a space between each wire if of a conductive wire, and similarly wrapping the lay of filaments about the layer of remagnetizable magnetic material and securing the second end of the lay in a similar fashion, reduces assembly time.

DETAILED DESCRIPTION OF THE PREFERRED EMBODIMENTS

Figure 1:
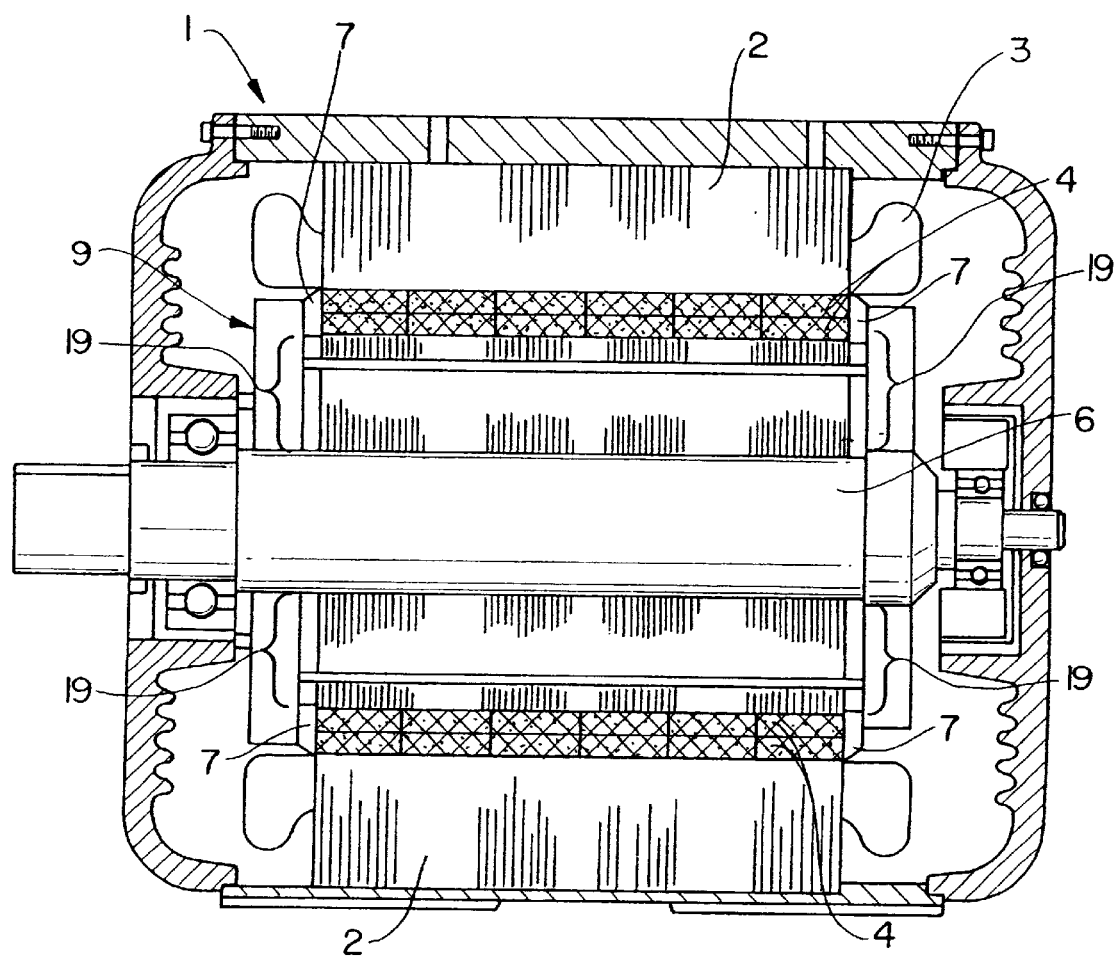
FIG. 1 illustrates a longitudinal vertical cross-section of a high speed, internal rotor controlled-pole electric machine containing an embodiment of the present invention.

The presently preferred embodiment of the inventive arrangement is shown in the drawings, it being understood, however, the inventive arrangements are not limited to the precise arrangement and instrumentality shown. FIG. 1 shows the rotor 9 employed in its preferred application, a controlled-pole electric machine 1. The controlled-pole electric machine 1 includes a stator core 2, a winding 3 and a rotor 9. The rotor 9 preferably has a rotor shaft 6, a laminated steel rotor core 19 surrounding the rotor shaft 6, and one or more layers of remagnetizable magnetic material 4 enveloping the laminated steel rotor core 19. In addition, two rotor end rings 7 preferably are disposed at each end of the laminated steel rotor core 19.

Figure 2:
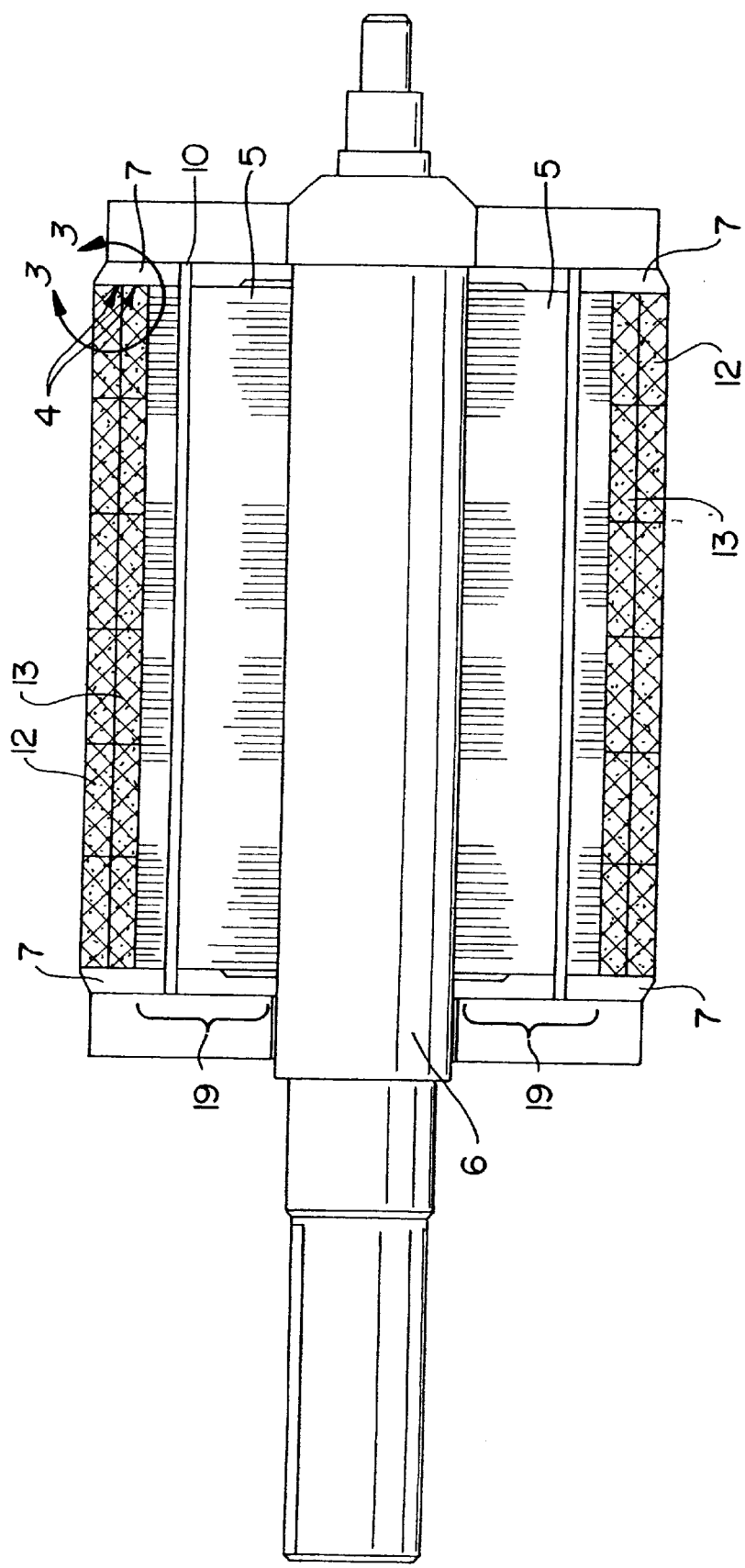
FIG. 2 illustrates a longitudinal vertical cross-section of an embodiment of the present invention.

As shown in FIG. 2, the laminated steel rotor core 19 can include conductor rods 10 inserted therethrough. Each conductor rod 10 preferably is welded into each end ring 7. Encasing the laminated steel rotor core 19, the layer(s) of remagnetizable magnetic material 4 can have a first layer of remagnetizable magnetic material 13 positioned on the exterior surface of the laminated steel rotor core 19, and a second layer of remagnetizable magnetic material 12 adjacent to the first layer of remagnetizable magnetic material 13.

Figure 3:
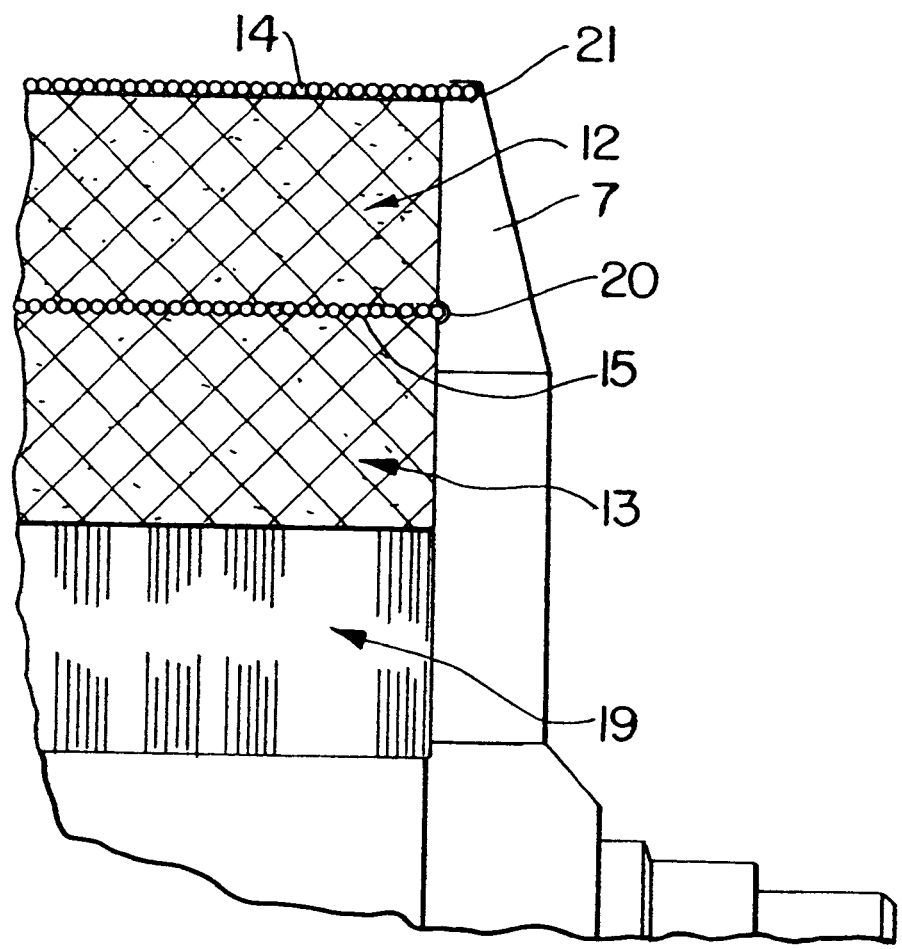
FIG. 3 illustrates an enlarged view of a portion of the preferred embodiment of the present invention as illustrated in FIG. 2.

FIG. 3 illustrates an enlarged view of the layers of remagnetizable magnetic material 4 as illustrated in FIG. 2. In the preferred embodiment, a first layer of magnetic high strength wire 15 preferably is wrapped about the first layer of remagnetizable magnetic material 13. The high strength wire 15 may have a circular in cross-section as depicted in the Figures, or the wire 15 may have a rectangular cross-section (not shown) having a width one to ten times its thickness. Advantageously, a rectangular cross-section permits a greater cross-section for a given thickness or air gap intrusion thereby providing greater restraint against the centrifugal force while preserving adequate suppression of eddy currents. Also, the rectangular cross-section has more surface area in contact with the underlying magnets providing greater resistance to axial slipping and possible electrical contact against the turn of wire. Furthermore, a wire 15 having rectangular cross-section is less likely to roll and is less susceptible to the propagation of nicks or abrasions across the wire, which can cause the wire to break.

The first layer of magnetic high strength wire 15 preferably is attached at each end of the rotor through groove 20 etched in rotor end ring 7, and preferably binds the first layer of remagnetizable magnetic material 13 to the laminated steel rotor core 19. Likewise, with this example where two layers of magnetic material are used, a second layer of high resistance or non-conductive, non-magnetic high strength fiber or wire 14 preferably is wrapped about the second layer of remagnetizable magnetic material 12. For purposes of this application, non-magnetic fiber or wire describes a wire having negligible remanence (residual induction) and hystersis. The second layer of non-conductive, non-magnetic high strength fiber or wire preferably is anchored at each end to groove 21 etched in rotor end ring 7, binding the second layer of remagnetizable magnetic material 12 to the first layer of remagnetizable magnetic material 13 and the laminated steel rotor core 19. Thus, the second layer of non-conductive, non-magnetic high strength fiber or wire 14 secures the second layer of remagnetizable magnetic material 12 to the laminated steel rotor core 19.

The first layer of magnetic high strength wire 15 preferably has properties similar to common music wire. In particular, the first layer of magnetic high strength wire 15 preferably has a tensile strength ranging from 225,000 PSI to over 400,000 PSI, and the first layer of high strength wire 15 preferably has the magnetic properties of a low coercive permanent magnet, although the present invention is not limited in this regard. The coercivity preferably is on the order of 50 oersteds and can have a residual induction of approximately 1 tesla. Preferably, the coefficient of thermal expansion of the high strength wire 15 is chosen to be compatible with the expansion coefficient characteristics of the rotor.

The second layer of high strength material 14 preferably is a non-magnetic high strength wire consisting of a low electrically conductive alloy of stainless steel. It will be appreciated, however, that one skilled in the art could substitute for stainless steel any number of non-conducting non-magnetic metallic alloys, or non-metallic high strength fibers, for example, carbon fiber. The advantage of using a non-conductive, non-magnetic high strength fiber or wire, such as the stainless steel used to form the second layer of high strength material 14, is the reduction of eddy current and hysteresis losses in this wire layer. It will be appreciated by one skilled in the art that forming this layer of wires in such a fashion as to preclude adjacent wires being in electrical contact with one another can mediate the requirement for the non-electrically conductive property of that wire.

Figure 4:
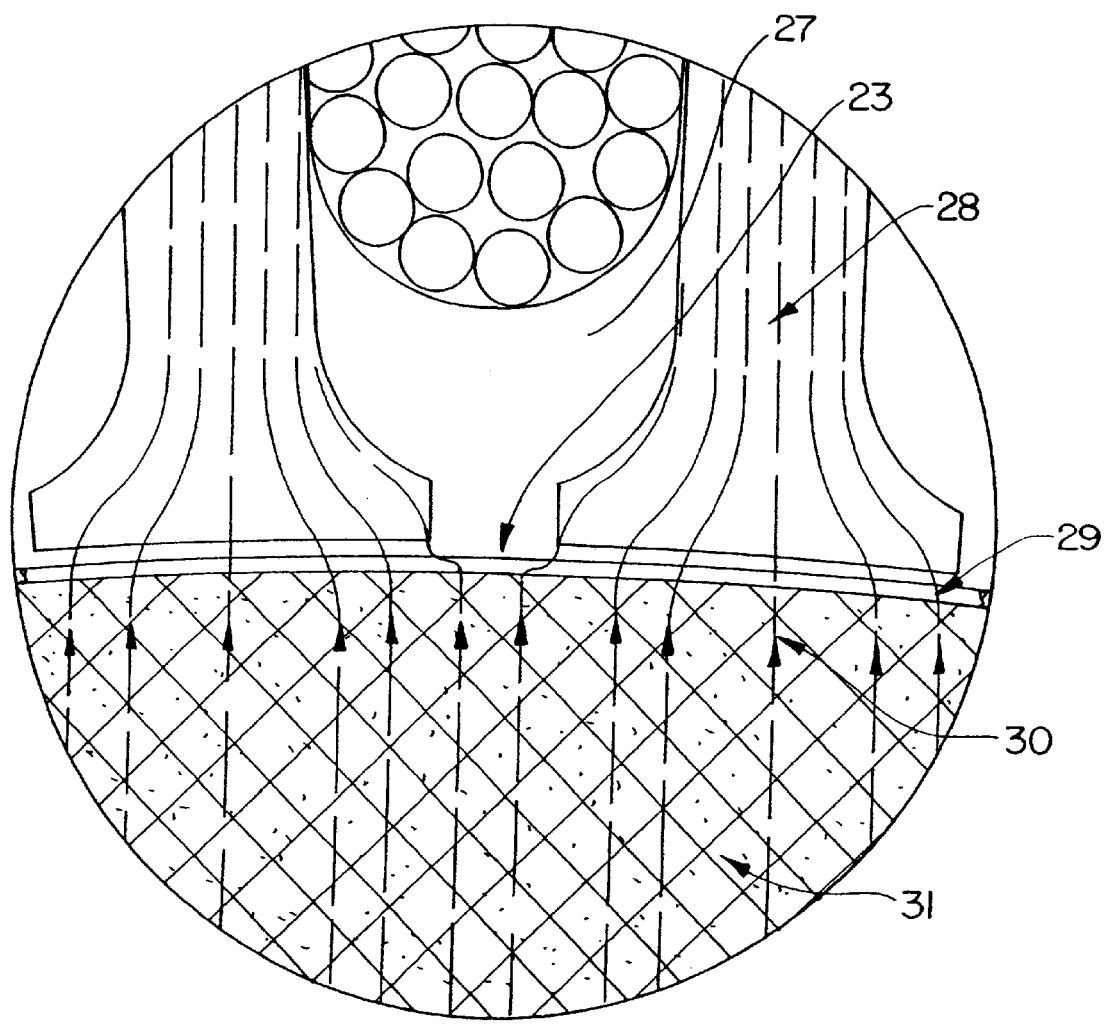
FIG. 4 illustrates an exploded cut-away view of a magnified transverse vertical partial cross-section of a controlled-pole electric machine utilizing a second layer of magnetic high strength wire.

FIG. 4 depicts the detrimental effect on the interface between a stator core 28 and a second layer of remagnetizable magnetic material 31 in a controlled-pole electric machine having a rotor using a second layer of magnetic high strength wire 29. In FIG. 4, one skilled in the art will observe an area of flux reversal 23, occurring below stator winding slot 27 in the stator core 28. In particular, FIG. 4 typifies the presence of magnetic losses caused by the area of flux reversal 23 in the second wire layer 29 which results in consequence of the use of a second layer of magnetic high strength wire 29 in lieu of the non-magnetic layer of high strength fiber or wire 14 of FIG. 3. These losses in the second wire layer 29 are caused by the flux reversal in the wire layer 29 relative to the normal rotor flux 30, as the magnetic wire section 29 passes by a stator winding slot 27.

Figure 4A:
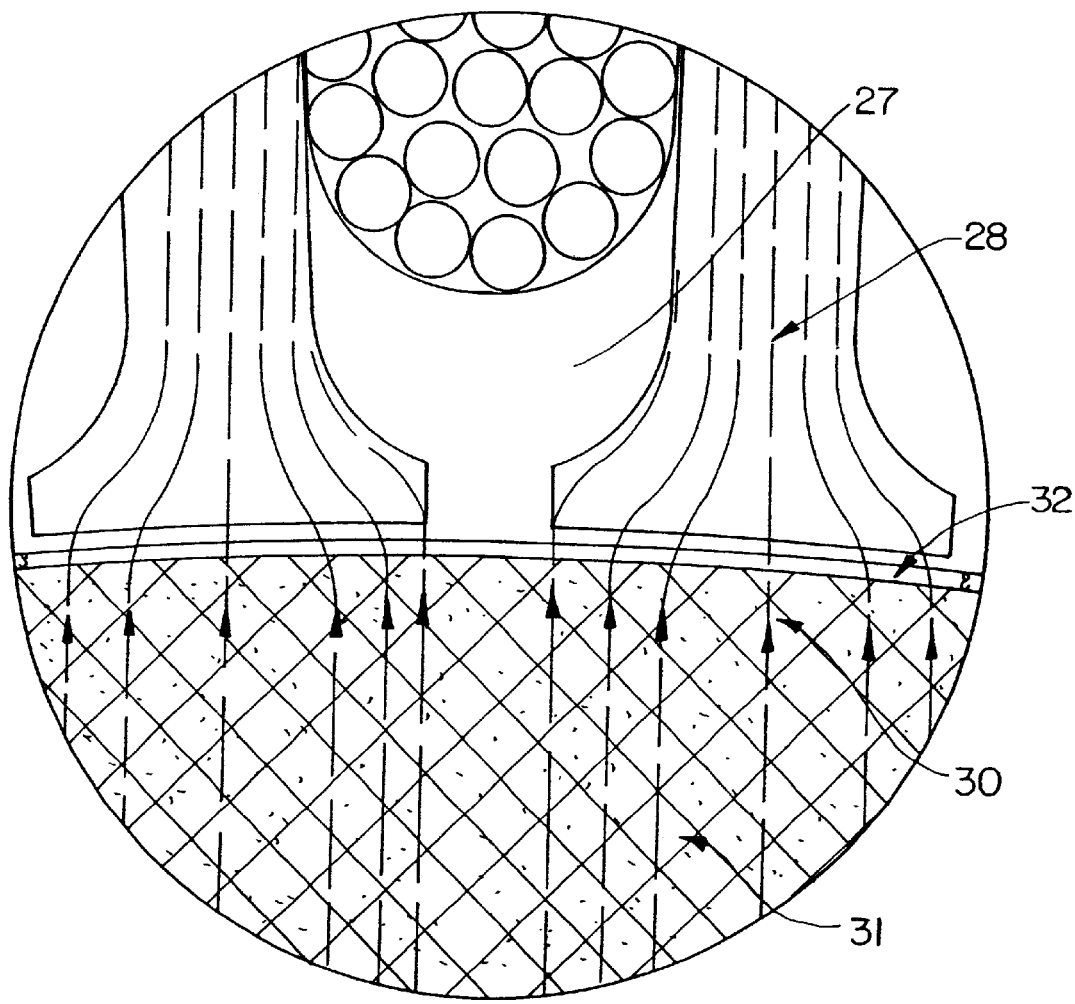
FIG. 4A illustrates an exploded cut-away view of a magnified transverse vertical partial cross-section of a controlled-pole electric machine utilizing a second layer of non-magnetic high strength wire.

FIG. 4A shows the absence of the detrimental effect of FIG. 4 in a controlled-pole electric machine having a rotor employing a second layer of non-magnetic high strength fiber or wire 32. In FIG. 4A, unlike the case in FIG. 4, an area of flux reversal does not exist below stator winding slot 27 in the stator core 28 in consequence of using of a second layer of non-magnetic high strength fiber or wire 32 in lieu of the magnetic layer of high strength wire 29 of FIG. 4. Thus, in the case of FIG. 4A, as in the present invention, magnetic losses are not present.

Figure 5:
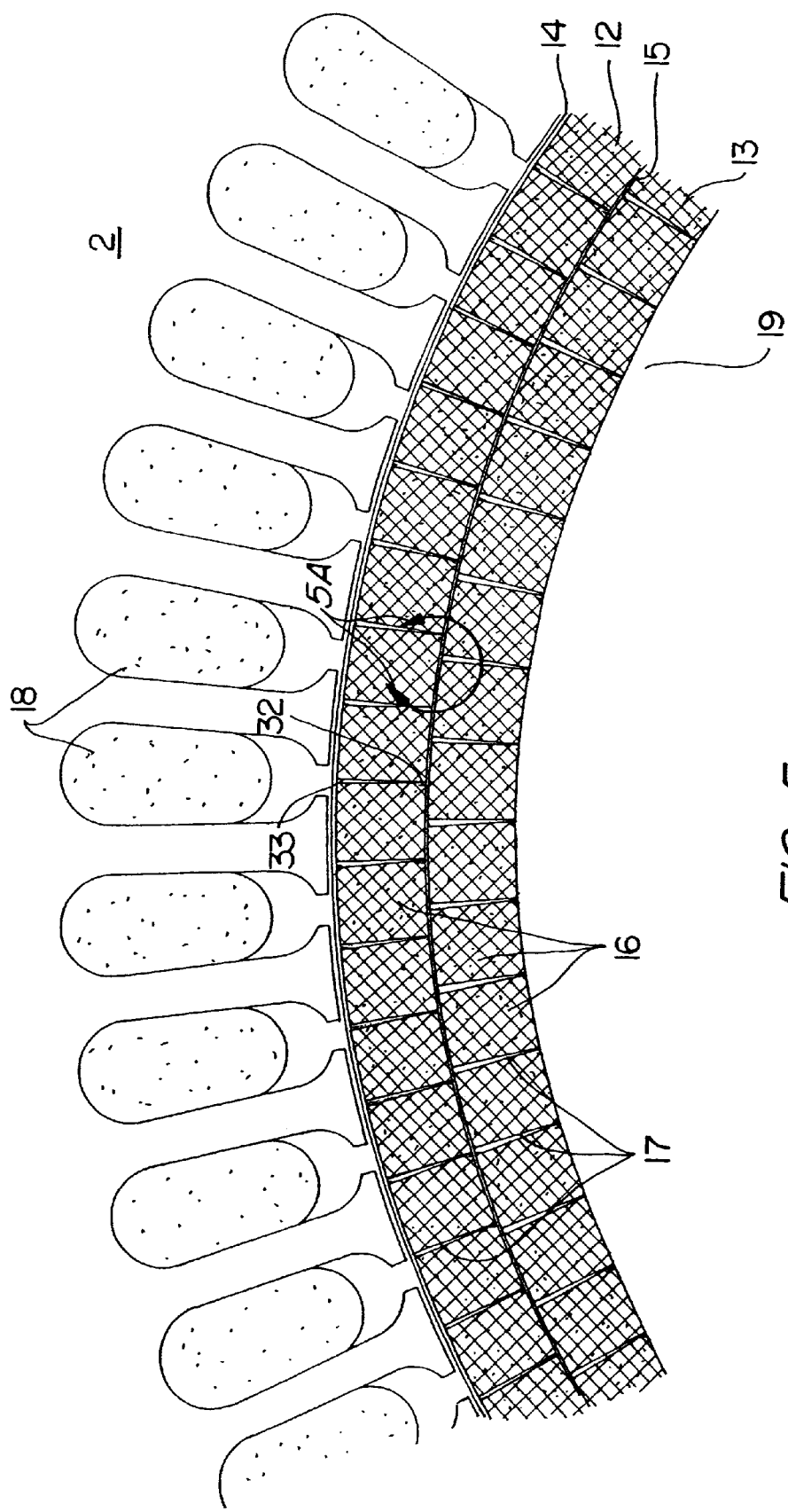
FIG. 5 illustrates a magnified transverse vertical partial cross-section of the present invention.

FIG. 5 shows a partial cross-section of the region of intersection between the in stator core 2 as shown in FIG. 1 and the outer portion of the rotor, as shown in FIG. 3, consisting of a second layer of non-magnetic high strength wire 14, a second layer of remagnetizable magnetic material 12, a first layer of magnetic high strength wire 15, a first layer of remagnetizable magnetic material 13, and laminated steel rotor core 19. Both the second layer of remagnetizable magnetic material 12 and the first layer of remagnetizable magnetic material 13 preferably consist of a plurality of magnetic blocks 16 positioned concentrically about the laminated steel rotor core 19, each magnetic block 16 positioned adjacent to one another. From FIG. 5, it will be apparent to one skilled in the art that the individual magnetic blocks 16 of both the second layer of remagnetizable magnetic material 12 and the first layer of remagnetizable magnetic material 13 are positioned such that there is a very small, but distinct, separation gap 17 between each magnetic block 16.

From FIG. 5, it will be apparent that the separation gap 17 between each magnetic block 16 widens from the narrowest gap 32 near the base of each magnetic block 16 to the broadest gap 33 near the surface of each magnetic block 16. The amount of the separation 17 preferably is calculated to allow room for the independent thermal expansion of each magnetic block 16 relative to the laminated steel rotor core 19 and neighboring magnetic blocks 16 at the narrowest portion of the separation 17. Typically, the expansion of a single magnetic block 16 is less than 0.002 inches per inch of magnetic block 16 length. Thus, each magnet block 16 should require less than 0.002 inches of space between each of its sides and adjacent magnetic blocks 16.

An adhesive layer preferably is disposed on each magnetic block 16 surface facing the laminated steel rotor core 19 and facing any adjacent magnetic block in that layer. The use of a thermally conductive pliant adhesive in the construction of the present invention can improve the thermal conductivity between the magnetic blocks 16 and the laminated steel rotor core 19 and preserve the thermal conductivity between the magnetic blocks 16 and the laminated steel rotor core 19 over the life of the machine despite the significant strains which can arise between the two due to differential thermal expansion. In addition, because both the outer layer of high strength wire 14, and the inner layer of high strength wire 15 provide the binding force necessary to resist the centripetal force experienced by the magnetic blocks 16 during the operation of the rotor 9, the adhesive layer need not be chosen for its binding characteristics. Rather, the adhesive layer can be chosen for its thermal conductivity, pliability and resistance to thermal aging, once set, and for its viscosity and wetting property during application.

Figure 5A:
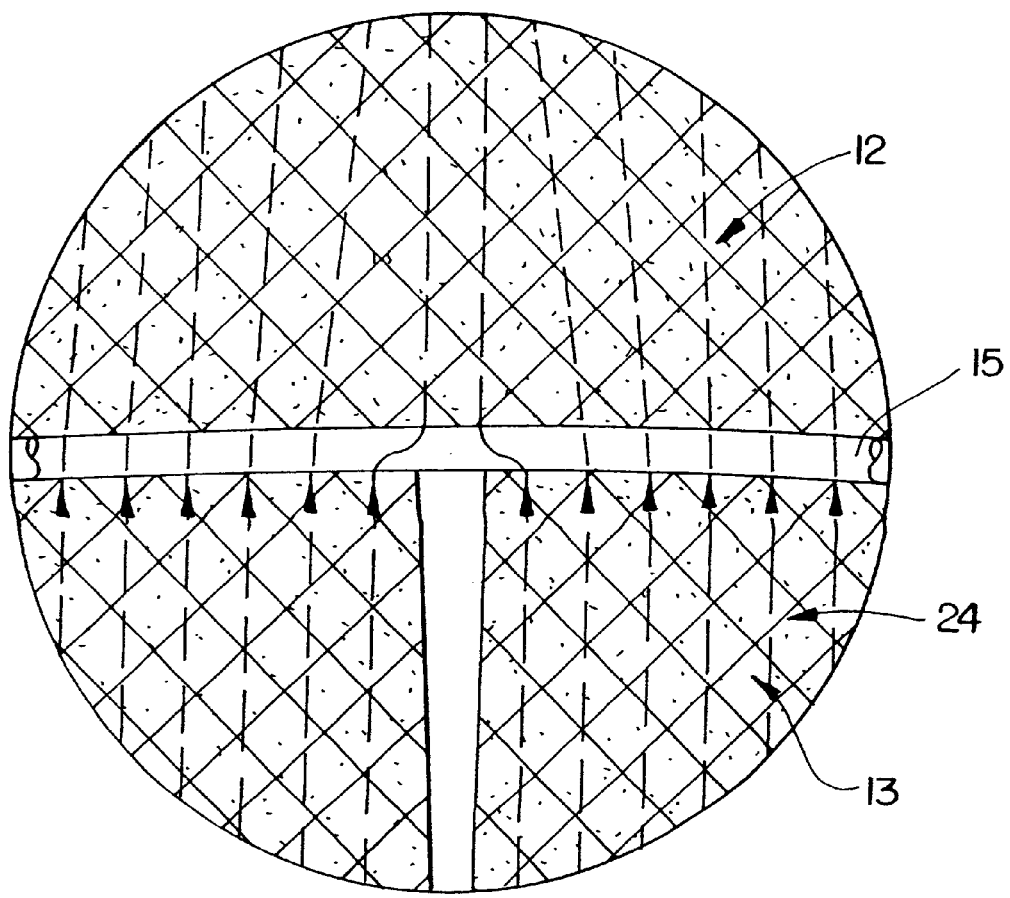
FIG. 5A illustrates an exploded cut-away view of the magnified transverse vertical partial cross-section illustrated in FIG. 5.

Turning now to FIG. 5A, it is a particular advantage of the present invention that the thickness of the first layer of magnetic high strength wire 15, due to its magnetic properties, does not increase the effective "air gap" between the second layer of remagnetizable magnetic material 12 and the first layer of remagnetizable magnetic material 13. In particular, the effective air gap preferably need be as small as practical. Typically, in a controlled-pole electric machine, an exciter coil embedded in a stator winding slot (for instance, stator winding slot 18 as shown in FIG. 5), when energized, can produce a strong magnetic flux of alternating polarity. Notably, the magnetic properties of the first layer of magnetic high strength wire 15 serve to improve the magnetic path of the rotor flux 24 presented by the exciter coil of the controlled-pole machine 1 of FIG. 1, by bridging gaps between the second layer of remagnetizable magnetic material 12 and the first layer of remagnetizable magnetic material 13. In this way, the rotor flux 24 can penetrate the magnetic layers 4 of FIG. 1 more uniformly so as to more effectively control the rotor poles.

Figure 6A:
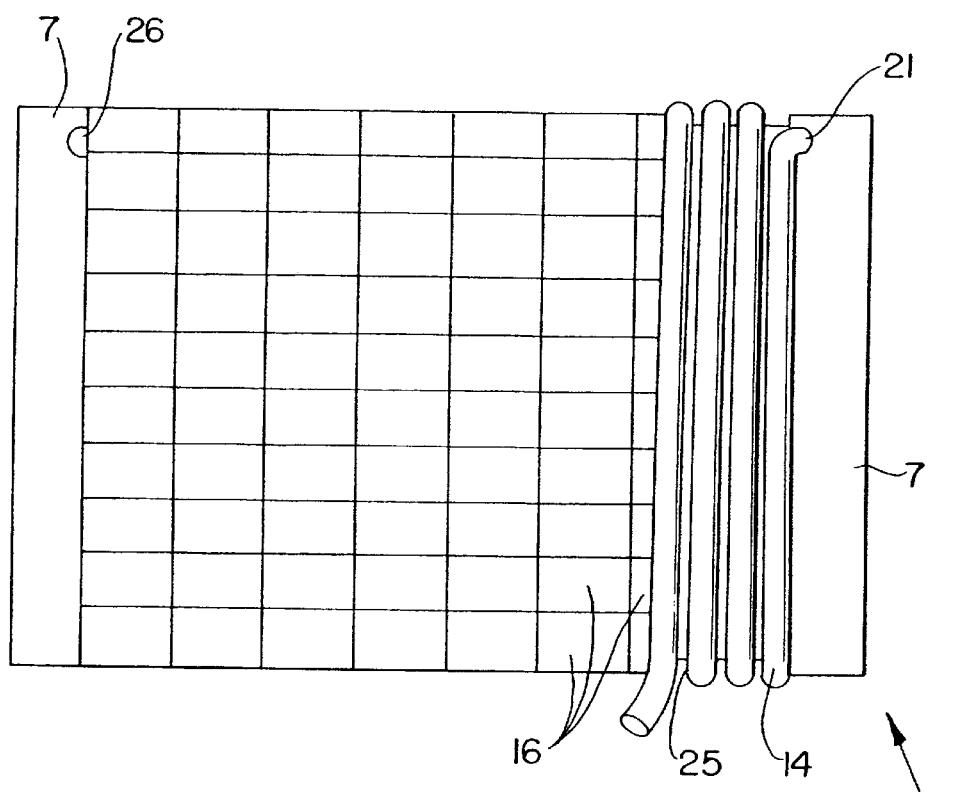
FIG. 6A illustrates a top view of the present invention having a single strand of high strength wire partially wrapped about the outermost layer of remagnetizable magnetic material.
Figure 6B:
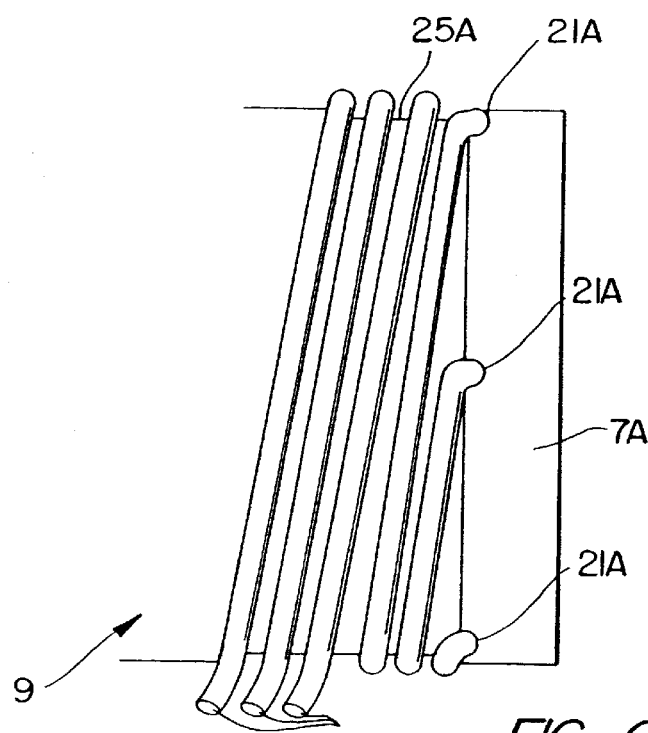
FIG. 6B illustrates a top view of the present invention having three strands of high strength wire partially wrapped about the outermost layer of remagnetizable magnetic material.

FIG. 6A is an illustration of a preferred method for applying the second layer of high strength wire 14 to the second layer of remagnetizable magnetic material 12, (and correspondingly, the first layer of high strength wire 15 to the first layer of remagnetizable magnetic material 13). Initially, the magnetic blocks 16 can be positioned to form the second layer of remagnetizable magnetic material 12. Subsequently, the second layer of high strength wire 14 can be attached to the groove 21 etched into end ring 7 by swaging, welding, or by any other suitable method. Likewise, where the use of multiple strands of high strength wire becomes preferable as in FIG. 6B, each strand of high strength wire 14A can be attached to grooves 21A, etched equidistantly about the end ring 7A circumference. Notably, the use of multiple strands of high strength wire 14A may become preferable where a decrease in production time is of paramount concern.

Prior to wrapping the second layer of magnetic material with the second layer of high strength wire 14, the second layer of high strength wire 14 preferably is pre-tensioned to a level that is greater than the centripetal force experienced by the second layer of remagnetizable magnetic material 12 during the high speed rotation of the rotor 9. Notwithstanding, the second layer of high strength wire 14 preferably is pre-tensioned to a tension less than the tensile strength of the second layer of high strength wire 14. Specifically, the second layer of high strength wire 14 is not pre-tensioned to a level beyond 50% of the maximum tensile strength of the second layer of high strength wire 14. Where multiple strands of wire are preferred, as in FIG. 6B, each strand of high strength wire 14A should be tensioned individually.

In either case, it is important for best results that the second layer of high strength wire 14, 14A be wrapped about the entire second layer of remagnetizable magnetic material 12 leaving only a very small, yet distinct space 25, 25A between each parallel strand of high strength wire 14, 14A. This greatly increases the effective electrical resistance of the second layer of high strength wire 14, 14A, thereby essentially eliminating possible eddy currents in the second high strength wire layer 14, 14A which otherwise may affect the performance of the controlled-pole electric machine 1 of FIG. 1. For this reason, it is important to have only a single layer of high strength wire 14, 14A at any location. Subsequent to wrapping, the second layer of high strength wire 14, 14A is then secured to groove 21, 21A etched into a second end ring 7, 7A opposite the first end ring 7, 7A.

I claim:

1. A method of constructing a rotor for use in a high speed controlled-pole electric machine, comprising the steps of:
    positioning an inner layer of remagnetizable permanent magnetic material over substantially an entire circumference of a rotor core exterior surface;
    positioning an outer layer of remagnetizable permanent magnetic material positioned over substantially an entire circumference defined by said inner layer of remagnetizable permanent magnetic material; and
    binding said inner and outer layers of remagnetizable permanent magnetic material to said rotor core exterior surface using an inner layer of high strength filament to bind said inner layer of remagnetizable permanent magnetic material to said rotor core exterior surface, and an outer layer of high strength filament to bind said outer layer of remagnetizable permanent magnetic material to said inner layer of remagnetizable permanent magnetic material.

2. The method according to claim 1, further comprising the step of selecting said inner layer of remagnetizable permanent magnetic material to have a first set of magnetic properties and said outer layer of remagnetizable permanent magnetic material to have a second set of magnetic properties, said first set of magnetic properties differing from said second set of magnetic properties.

3. The method according to claim 1, further comprising the step of forming at least one of said layers of remagnetizable permanent magnetic material from a plurality of magnetic blocks.

4. The method according to claim 3, further comprising the step of applying a pliant adhesive layer on an inward-facing surface of said magnetic blocks, said inward-facing surface relative to said rotor, whereby said pliant adhesive layer can hold each said magnetic block in place prior to said binding step.

5. The method according to claim 3, further comprising the steps of:

calculating a separation gap between adjacent ones said magnetic blocks to allow for a thermal expansion of each said magnetic block; and, separating each said magnetic block by approximately said calculated separation gap.

6. The method according to claim 5, wherein said calculating step further comprises providing approximately a 0.002 inch separation gap for each inch of magnetic block length.

7. The method according to claim 1, wherein said binding step further comprises:

pretensioning a strand of high strength filament to a tenseness greater than a maximum centripetal force anticipated to be experienced by said layers of remagnetizable permanent magnetic material when rotating said rotor in a high-speed controlled-pole electric machine;

securing a first end of said high strength filament to a first end of said rotor;

wrapping said high strength filament about said layers of remagnetizable permanent magnetic material leaving a small but distinct space between each parallel strand of said high strength filament and entirely covering said layer of remagnetizable permanent magnetic material; and, securing a second end of said high strength filament to a second end of said rotor.

8. The method according to claim 1, further comprising the step of selecting a magnetic high strength wire as said inner layer of high strength filament.

9. The method according to claim 1, further comprising the step of selecting a filament formed of high strength fibers as said inner layer of high strength filament.

10. The method according to claim 1, further comprising the step of selecting a non-magnetic wire as said outer layer of high strength filament.

11. The method according to claim 1, further comprising the step of selecting a magnetic high strength wire as said inner layer of high strength filament and a non-magnetic wire as said outer layer of high strength filament.

12. A method of constructing a rotor for use in a high speed controlled-pole electric machine comprising the steps of:

positioning a plurality of magnetic blocks about a rotor core exterior surface, said magnetic blocks forming an inner layer of remagnetizable magnetic material;

binding said inner layer of remagnetizable magnetic material to said rotor core exterior surface using an inner layer of high strength wire;

positioning a second plurality of magnetic blocks over substantially an entire circumference defined by said inner layer of remagnetizable magnetic material to form an outer layer of remagnetizable magnetic material; and binding said outer layer of remagnetizable magnetic material to said inner layer of remagnetizable magnetic material using an outer layer of high strength wire.

13. The method according to of claim 12, further comprising the step of selecting said inner layer of remagnetizable magnetic material to have a first set of magnetic properties and said outer layer of remagnetizable magnetic material to have a second set of magnetic properties, said first set of magnetic properties differing from said second set of magnetic properties.

14. The method according to claim 12, further comprising the step of applying a pliant adhesive layer on an inward-facing surface of said magnetic blocks, said inward-facing surface relative to said rotor, whereby said pliant adhesive layer can hold each said magnetic block in place prior to said binding step.

15. The method according to claim 12, further comprising the step of selecting a magnetic high strength wire as said inner layer of high strength wire and a non-magnetic wire as said outer layer of high strength wire.

* * * * *